United States Patent
Terry et al.

(10) Patent No.: US 11,102,785 B2
(45) Date of Patent: Aug. 24, 2021

(54) APPARATUS AND METHOD SELECTING A BASE STATION IN A NETWORK

(71) Applicant: AIRSPAN IP HOLDCO LLC, Boca Raton, FL (US)

(72) Inventors: Kevin Andrew Terry, Devon (GB); Alan Carter, Bath (GB)

(73) Assignee: AIRSPAN IP HOLDCO LLC, Boca Raton, FL (US)

( * ) Notice: Subject to any disclaimer, the term of this patent is extended or adjusted under 35 U.S.C. 154(b) by 0 days.

(21) Appl. No.: 15/782,051

(22) Filed: Oct. 12, 2017

(65) Prior Publication Data

US 2019/0116600 A1 Apr. 18, 2019

(51) Int. Cl.
*H04W 72/08* (2009.01)
*H04W 48/20* (2009.01)
*H04W 48/04* (2009.01)
*H04W 48/16* (2009.01)
*H04W 84/10* (2009.01)
*H04W 24/02* (2009.01)
*H04W 88/04* (2009.01)
*H04W 72/04* (2009.01)

(52) U.S. Cl.
CPC ............ *H04W 72/08* (2013.01); *H04W 48/04* (2013.01); *H04W 48/16* (2013.01); *H04W 48/20* (2013.01); *H04W 24/02* (2013.01); *H04W 72/0426* (2013.01); *H04W 72/0453* (2013.01); *H04W 84/105* (2013.01); *H04W 88/04* (2013.01)

(58) Field of Classification Search
None
See application file for complete search history.

(56) References Cited

U.S. PATENT DOCUMENTS

| 6,075,988 A | 6/2000 | Anderson et al. |
| 9,325,398 B2 | 4/2016 | Negus et al. |
| 10,051,497 B1 | 8/2018 | Parihar et al. |
| 10,070,325 B2 | 9/2018 | Logothetis |
| 10,123,218 B1 | 11/2018 | Yang et al. |

(Continued)

FOREIGN PATENT DOCUMENTS

| CN | 102056242 A | 5/2011 |
| CN | 104469891 A | 3/2015 |

(Continued)

OTHER PUBLICATIONS

U.S. Office Action in U.S. Appl. No. 15/802,804 dated Aug. 23, 2018, 16 pages.

(Continued)

*Primary Examiner* — Mohammad S Adhami
(74) *Attorney, Agent, or Firm* — Haynes Beffel & Wolfeld LLP; Mark A. Haynes; Andrew L. Dunlap (57) ABSTRACT

An apparatus configured to operate in a network comprises: control circuitry configured to perform a selection operation to select a preferred base station from one or more base stations in the network, each base station having a backhaul connection; connection circuitry configured to connect to the preferred base station; and communication circuitry configured to receive characteristic data of the backhaul connection of each of the one or more base stations. The control circuitry is configured to perform the selection operation in dependence on the characteristic data.

15 Claims, 6 Drawing Sheets

(56) References Cited

U.S. PATENT DOCUMENTS

| | | |
|---|---|---|
| 2001/0020915 A1 | 9/2001 | Proctor |
| 2003/0195017 A1 | 10/2003 | Chen et al. |
| 2003/0228857 A1 | 12/2003 | Maeki |
| 2005/0245275 A1 | 11/2005 | Byford et al. |
| 2005/0277443 A1 | 12/2005 | Ozluturk |
| 2007/0218910 A1 | 9/2007 | Hill et al. |
| 2009/0239533 A1 | 9/2009 | Somasundaram et al. |
| 2009/0264123 A1 | 10/2009 | Agashe et al. |
| 2011/0081903 A1 | 4/2011 | Cai et al. |
| 2011/0143673 A1 | 6/2011 | Landesman et al. |
| 2012/0028627 A1 | 2/2012 | Hunzinger |
| 2012/0218964 A1 | 8/2012 | Park et al. |
| 2012/0264368 A1 | 10/2012 | Aminaka et al. |
| 2013/0183971 A1 | 7/2013 | Tamaki et al. |
| 2013/0208653 A1 | 8/2013 | Morioka et al. |
| 2013/0260760 A1 | 10/2013 | Pan et al. |
| 2014/0192704 A1 | 7/2014 | Yi et al. |
| 2014/0301371 A1 | 10/2014 | Maeda et al. |
| 2014/0313914 A1 | 10/2014 | Ling |
| 2015/0024757 A1 | 1/2015 | Bulakci et al. |
| 2015/0043422 A1 | 2/2015 | Fujishiro et al. |
| 2015/0063199 A1 | 3/2015 | Wang et al. |
| 2015/0065136 A1 | 3/2015 | Lee et al. |
| 2015/0131618 A1 | 5/2015 | Chen |
| 2015/0319677 A1 | 11/2015 | Colban et al. |
| 2015/0373611 A1 | 12/2015 | Liu et al. |
| 2016/0380353 A1 | 12/2016 | Lysejko et al. |
| 2016/0380354 A1 | 12/2016 | Bozier et al. |
| 2016/0380355 A1 | 12/2016 | Lysejko et al. |
| 2016/0381570 A1 | 12/2016 | Lysejko et al. |
| 2016/0381574 A1 | 12/2016 | Dudzinski et al. |
| 2016/0381590 A1 | 12/2016 | Lysejko et al. |
| 2016/0381591 A1 | 12/2016 | Lysejko et al. |
| 2017/0208574 A1* | 7/2017 | Ramakrishna ........ H04L 5/0055 |
| 2017/0208632 A1* | 7/2017 | Gunasekara .......... H04W 76/10 |
| 2017/0215117 A1 | 7/2017 | Kwon et al. |
| 2018/0020486 A1 | 1/2018 | Yano et al. |
| 2018/0041605 A1 | 2/2018 | Zhang et al. |
| 2018/0070250 A1 | 3/2018 | Venkataraman et al. |
| 2018/0076877 A1* | 3/2018 | Liu .................... H04B 7/15507 |
| 2018/0279192 A1* | 9/2018 | Raissinia .............. H04W 36/38 |
| 2018/0352473 A1 | 12/2018 | Gunasekara et al. |
| 2018/0359788 A1* | 12/2018 | Abedini ............ H04W 74/0875 |
| 2019/0028343 A1 | 1/2019 | Putman et al. |

FOREIGN PATENT DOCUMENTS

| | | |
|---|---|---|
| EP | 2034786 A1 | 3/2009 |
| EP | 2698034 A1 | 2/2014 |
| WO | 2005125021 A2 | 12/2005 |
| WO | 2005125021 A3 | 8/2006 |
| WO | 2008007375 A2 | 1/2008 |
| WO | 2008007375 A3 | 7/2009 |
| WO | 2012140999 A1 | 10/2012 |
| WO | 2014106539 A1 | 7/2014 |
| WO | 2014126161 A1 | 8/2014 |

OTHER PUBLICATIONS

U.S. Final Office Action in U.S. Appl. No. 15/802,804 dated Jan. 29, 2019, 22 pages.
PCT Search Report and Written Opinion from PCT/GB2018/052738 dated Dec. 3, 2018, 14 pages.
PCT Search Report and Written Opinion from PCT/GB2018/052740 dated Nov. 28, 2018, 18 pages.
UK Combined Search and Exam Report from GB1815785.9. dated Mar. 22, 2019, 7 pages.
UK Combined Search and Exam Report from GB1815790.9 dated Mar. 22, 2019, 8 pages.
UK Combined Search and Exam Report from GB1815793.3 dated Mar. 12, 2019, 8 pages.
U.S. Office Action in U.S. Appl. No. 15/782,035 dated Feb. 25, 2019, 16 pages.
U.S. Office Action in U.S. Appl. No. 15/802,804 dated May 8, 2019, 16 pages.
U.S. Final Office Action in U.S. Appl. No. 15/802,804 dated Sep. 9, 2019, 20 pages.
U.S. Office Action in U.S. Appl. No. 15/782,035 dated Sep. 3, 2019, 22 pages.
U.S. Appl. No. 151782,035—Notice of Allowance dated Mar. 9, 2020, 20 pages.
U.S. Appl. No. 15/802,804—Notice of Alllowance dated Nov. 27, 2019, 18 pages.

* cited by examiner

| Base Station | Cell ID | RSRP | Valid |
|---|---|---|---|
| HeNB1 | 000 01 | 011 | - |
| HeNB2 | 000 10 | 001 | - |
| DeNB1 | 111 01 | 010 | - |
| DeNB2 | 111 10 | 100 | - |

Mask : '000'

| Base Station | Cell ID | RSRP | Valid |
|---|---|---|---|
| HeNB1 | 000 01 | 011 | 0 |
| HeNB2 | 000 10 | 001 | 0 |
| DeNB1 | 111 01 | 010 | 1 |
| DeNB2 | 111 10 | 100 | 1 |

FIG. 7

APPARATUS AND METHOD SELECTING A BASE STATION IN A NETWORK

BACKGROUND

The present technique relates to an apparatus for selecting a base station in a network.

As more and more users embrace mobile technology, ever greater demands are placed on the networks used to support mobile communication. Network operators are required to not only support a larger number of devices, but also to accommodate for more complex functionality of the devices within the network. As such, capacity requirements within the network are increasing. To accommodate for these growing capacity requirements, network operators are developing their infrastructures to include an increasing number of base stations, which provide network coverage to devices. When a device selects a base station to form a connection with, it will typically do so by considering the signal strength of the local connection between itself and any available base stations, and then subsequently selecting the available base station with which it can form the strongest local connection. However, significant bandwidth and reliability limitations can still arise when this approach is followed.

SUMMARY

In one example configuration, there is provided an apparatus comprising: control circuitry configured to perform a selection operation to select a preferred base station from one or more base stations in the network, each having a backhaul connection; connection circuitry configured to connect to said preferred base station; and communication circuitry configured to receive characteristic data indicative of a characteristic of said backhaul connection of each of said one or more base stations; wherein said control circuitry is configured to perform said selection operation in dependence on said characteristic data.

In another example configuration, there is provided an apparatus configured to operate in a network, comprising: means for performing a selection operation to select a preferred base station from one or more base stations in the network, each having a backhaul connection; means for connecting to said preferred base station; and means for receiving characteristic data indicative of a characteristic of said backhaul connection of each of said one or more base stations; wherein said means for performing is configured to perform said selection operation in dependence on said characteristic data.

In another example configuration, there is provided a method for an apparatus configured to operate in a network, said method comprising: selecting a preferred base station from one or more base stations in the network, each having a backhaul connection; connecting to said preferred base station; and receiving characteristic data indicative of a characteristic of said backhaul connection of each of said one or more base stations; wherein said preferred base station is selected in dependence on said characteristic data.

BRIEF DESCRIPTION OF THE DRAWINGS

The present technique will be described further, by way of example only, with reference to embodiments thereof as illustrated in the accompanying drawings in which.

DESCRIPTION OF EXAMPLES

Before discussing the present technique with reference to the accompanying figures, the following description of examples is provided.

In one example an apparatus configured to operate in a network comprises: control circuitry configured to perform a selection operation to select a preferred base station from one or more base stations in the network, each having a backhaul connection; connection circuitry configured to connect to said preferred base station; and communication circuitry configured to receive characteristic data indicative of a characteristic of said backhaul connection of each of said one or more base stations; wherein said control circuitry is configured to perform said selection operation in dependence on said characteristic data.

The present technique recognises that bandwidth and reliability limitations can be reduced by taking a broader view of network connections when selecting a base station, as the connection between the apparatus and a base station is orthogonal to other upstream connections of the base stations. For example, when an upstream connection of the base station is of poor quality, or unreliable, it acts as a weak link in a chain of connections, and consequently the overall quality of service for the apparatus will also be poor and unreliable. Therefore, by considering characteristic data indicative of a characteristic of the backhaul connection when selecting a base station, a preferred base station having a more reliable and higher quality backhaul connection to the network can be selected. Selecting a base station in in this way improves the connection of the apparatus to the network, via the base station, as it is less likely that the apparatus will connect to a base station providing unreliable lower quality backhaul connections, and also improves the overall network coverage provided by the network infrastructure as the number of connections to lower throughput, less reliable base stations, is reduced.

In some examples, said control circuitry is configured to obtain connection quality information comprising data indicative of a connection quality between said apparatus and each of said one or more base stations; and said control circuitry is configured to perform an initial selection operation to select an initial base station in dependence on said connection quality data. Hence the apparatus can be arranged to consider both the backhaul connection of a given base station to an upstream device, such as a server, and the connection between the base station and the apparatus itself.

In some examples, in absence of said characteristic data, said connection circuitry is configured to maintain a connection with said initial base station. When characteristic data is absent the selection operation cannot be performed, and thus the preferred base station will be undetermined. However, a connection to the network is still provided by way of the initial base station. Whilst such a connection may not be of the same quality, or as reliable, as that which could be provided by the preferred base station, it remains advantageous for the apparatus to have some degree of network connectivity, as provided by the initial base station.

In some examples, said connection quality information comprises RSRP values, and said initial selection operation comprises selecting a base station with a highest RSRP value as said initial base station. RSRP (Reference Signal Received Power) values reflect the power level of a signal received from the one or more base stations, and can be used to as a good indication of the quality of a local connection that the apparatus could make to the one or more base stations.

In some examples, said communication circuitry is configured to obtain identification values corresponding to each of said one or more base stations, and to transmit a request for characteristic data, said request comprising said identification values. The identification values can thus be used to determine characteristic data that is specific to the apparatus, and the one or more base stations that it can considered for selection. As such, less processing is required of the apparatus since there will be no need to filter out characteristic data relating to base stations other than the one or more base stations.

In some examples, said characteristic data comprises a mask value; said communication circuitry is configured to obtain identification values corresponding to each of said one or more base stations; and said control circuitry is configured to apply said mask to said identification values to determine a set of base stations from said one or more base stations. The mask value is used to perform a masking operation and can be considered relatively small in terms of data size. Therefore, receiving a mask value, as opposed to a further list of preferred base stations to select from for example, reduces traffic in the network. Furthermore, masking the identification values, rather than comparing the further list to the identification values, requires less data processing, and hence a more efficient apparatus is provided.

In some examples, the characteristic data identifies which of said one or more base stations are macro base stations. Macro base stations typically have a more reliable, higher bandwidth and higher quality backhaul connection. In some examples, macro base stations comprise base stations configured to form a wireless connection with an antenna system of a server. A macro base station could offer a higher MIMO ranking and/or carrier aggregation than a femto base station and so in some embodiments can be distinguished based on either or both of these characteristics. A high quality connection of this type can be achieved by mounting the antennas of macro base stations on ground based masts, rooftops, or other existing structures, in order to provide an unobstructed pathway for radio signals to be propagated to/from the antenna system of the server. Macro base stations may comprise base stations having a power output of tens of watts or greater. Therefore, the apparatus can use the characteristic data to select a macro base station as the preferred base station in order to benefit from the higher quality, more reliable backhaul connection.

In some examples, the characteristic data identifies which of said one or more base stations are femto base stations. Femto base stations typically comprise small, lower power devices, which are deployed in the homes or offices of network users to provide a small area of enhanced network coverage. In some examples, femto base stations comprise base stations configured to form a wired connection with a server. This may be via a user's broadband connection for example. Whilst such a connection may be used to service a small amount of domestic network traffic, it will typically have a relatively low throughput capacity, less than a connection between a macro base station and a server for example. Furthermore, there can be no guarantee that the owner of femto base station will not turn it off at any given point. Therefore, the apparatus can use the characteristic data to exclude femto base stations from selection in order to avoid a poorer backhaul connection.

In some examples, the backhaul requirement corresponds to any one or more of: average uptime; hop length; bandwidth capacity; and throughput capacity. The average uptime of a base station may be a value indicative of the ratio between the time during which the base station is in operation and the time during which the base station is switched off. Hop length may be a value indicative of the number of relays via which a transmission must be sent to reach a server. Bandwidth may be may be a value indicative of the maximum volume of network traffic that can be transmitted via a backhaul connection. Throughput may be a value determined as a function of bandwidth that also accounts for factors such as latency and reception quality for example.

In some examples, the apparatus further comprises GPS circuitry configured to determine GPS position data of said apparatus, and said communication circuitry is configured to transmit a request for characteristic data comprising said GPS position data. In this way, characteristic data can be determined based on the GPS location of the apparatus. For example, should it be determined that based on the current location of the apparatus there are no base stations suitable for selection as the preferred base station, a check of the nearby area can be made to determine whether there are any suitable base stations in close vicinity to the apparatus.

In some examples, the communication circuitry is configured to receive GPS position adjustment data indicating an alternative GPS position for said apparatus. The GPS adjustment data can be used to determine an alternative location at which the apparatus should be redeployed on the assumption that better candidates for the preferred base station will be available to the apparatus at the alternative location. The apparatus will then be able to take advantage of any better backhaul connections provided by base stations at the alternative location.

Particular examples will now be described with reference to the Figures.

Figure 1:
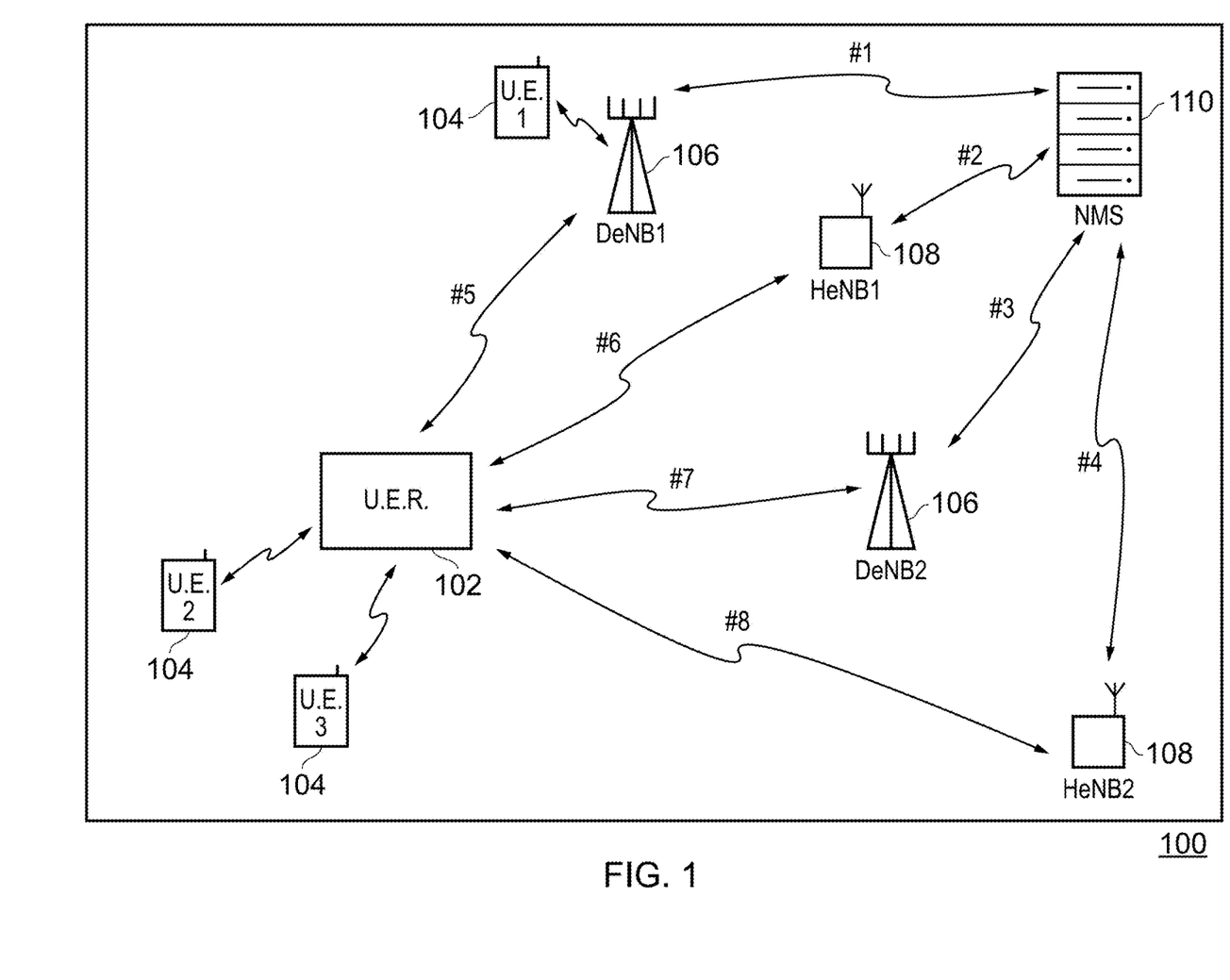
FIG. 1 illustrates one example of a network according to the present technique.

FIG. 1 shows an example of the network infrastructure in which an apparatus according to the present technique may be deployed. The network 100 comprises a network management server 110, two macro base stations 106 and two femto base stations 108. The macro base stations 106 are high power cells installed by the network operators and are configured as Donor eNodeBs (DeNBs) to provide a large area of network coverage to network users. By contrast, the femto base stations 108 are Home eNodeBs (HeNBs) that have been purchased and installed by network users. The HeNBs may be installed in a home, or office, for example, and are configured to provide a smaller area of network coverage than the DeNBs.

In the exemplary network 100, there are three items of user equipment (UEs) 104, which are mobile devices such as smartphones or tablets, for example. A user may connect their UE 104 to one of the base stations 106, 108 in order to connect to the network and make use of any services provided by the network operator. For example, FIG. 1 shows user equipment UE1 connected to DeNB1. In some instances, due to geographical constraints and physical obstacles, UEs may not have access to a high quality connection to a base station 106, 108. Therefore, the network further comprises a user equipment relay (UER) 102, which is arranged to provide enhanced network coverage to UEs by relaying signals between the base stations 106, 108 and the UEs 104.

It will be appreciated that in FIG. 1, the four illustrated base stations DeNB1, DeNB2, HeNB1 and HeNB2 are available base stations within range of the UER 102. However, the network 100 may comprise further base stations that are either unavailable, or outside of the range of the UER 102.

The present technique recognises that the base stations 106, 108 vary in terms of the connection quality that they can provide to the UER 102 and the UEs 104 in dependence on the quality and reliability of their upstream backhaul connection to the network management server 110. For example, the backhaul connections #1 and #3 formed between the macro base stations 106 and the network management server 110 are dedicated, reliable, high throughput and high quality connections. However, the backhaul connections #2 and #4 formed between the femto base stations 108 and the network management server 110 may be made via a network user's domestic internet connection for example, and thus have a lower throughput, connection quality than that of the backhaul of the macro base stations. Furthermore, the backhaul connections provided by the femto base stations are not considered to be as reliable as those formed by the macro base stations. This may be due to the fact that the HeNBs are privately owned by network users, and may be turned off at any time, for example. As such, the backhaul connection provided by the femto base stations are not usually considered as reliable as that provided by the macro base stations. Therefore, it is preferable that the UER 102 relays signals via one of the macro base stations, rather than via one of the femto base stations, in order to provide higher quality enhanced network coverage to the UEs 104.

The quality and reliability of a backhaul can be measured in a number of ways. For example, a good measure of reliability is the average uptime of a base station, as this corresponds to the likelihood that the backhaul for that base station will be useable by devices connecting to that base station. The bandwidth capacity of a backhaul is also a good measure of quality and reliability because a base station having a larger bandwidth backhaul will be more likely to accommodate data to be transmitted than a base station having a smaller bandwidth backhaul. In some other instances, it may be preferable to consider the quality of a backhaul in terms of throughput rather than bandwidth, which also accounts for latency for example. For example, a base station having a larger bandwidth backhaul connection to a server that also has a greater hop length may have a lower throughput than a base station with a smaller bandwidth backhaul connection to the server that has a smaller hop length.

Figure 2:
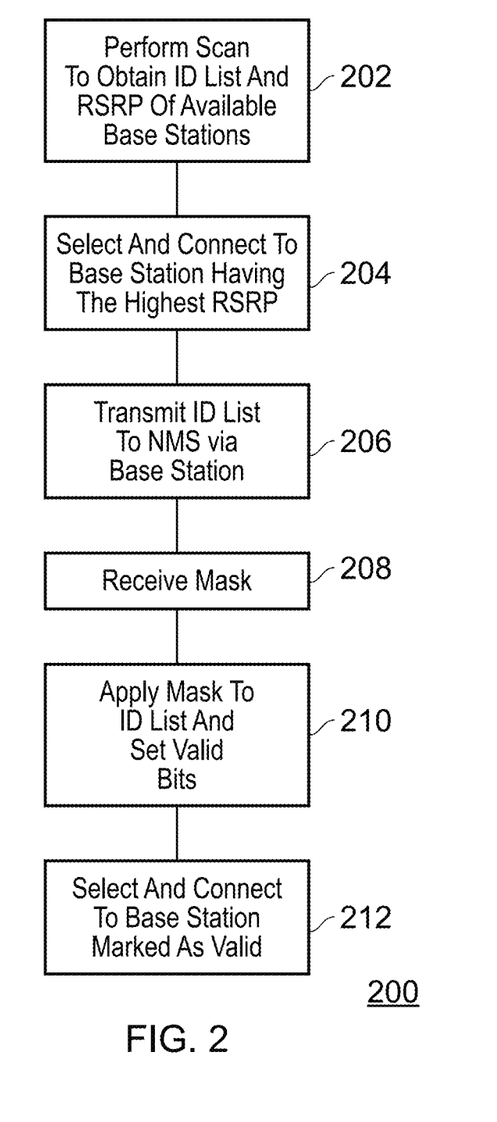
FIG. 2 illustrates one example of a method according to the present technique.

FIG. 2 shows one example of a method 200 according to the present technique, which may be implemented by the UER 102 to improve network connectivity in the network 100. In step 202, an initial scan is performed to obtain an ID list of the available base stations within range of the apparatus 102. During the scan, the apparatus 102 also obtains an RSRP value for each of the base stations, which can be used as an indication of the connection quality of any potential connection between the UER 102 and each one of the base stations (i.e. connections #5, #6, #7, #8). In step 204, the apparatus selects the base station having the highest RSRP value to form a connection with, and as shown in step 206, subsequently transmits the ID list obtained in step 202 to the network management server via the selected base station. In step 208, the apparatus 102 receives a mask, the mask having been determined by the network management server based on the ID list previously transmitted by the UER 102. In step 210, the mask is applied to the ID list in order to set valid bits indicative of a set of base stations with which it would be preferable for the UER 102 to form a connection. In step 212, the UER selects the base station from the set having the highest RSRP value to connect to. This provides the network operators with the ability to indicate to a UER 102 a preferred set of base stations with which it should form a connection. For example, the network operator may transmit a mask which, when applied to the ID list will cause HeNBs to have their valid bits set to '0', indicating that they are invalid. As such, HeNBs can be excluded from this preferred set in order to prevent the UER 102 from relying on the less reliable backhaul connection of the HeNBs when providing enhanced network coverage to the UEs 104. The UER 102 will instead select one of the DeNBs to form a connection with, and thus data transmitted/received on behalf of the UEs 104 will benefit from a more reliable, higher quality connection, thus improving the quality of service provided by the UER 102.

In some examples, the base station selected in step 212 may be the same base station selected in step 204. In this case, the apparatus 102 need not form any connections, and may simply maintain the connection formed in step 204.

It will be appreciated that between step 204 and 206 the UER 102 will communicate with the network via the base station selected in step 204. This is because in absence of the mask, the UER102 will be unable to determine a different base station to use to communicate with the network.

Figure 3:
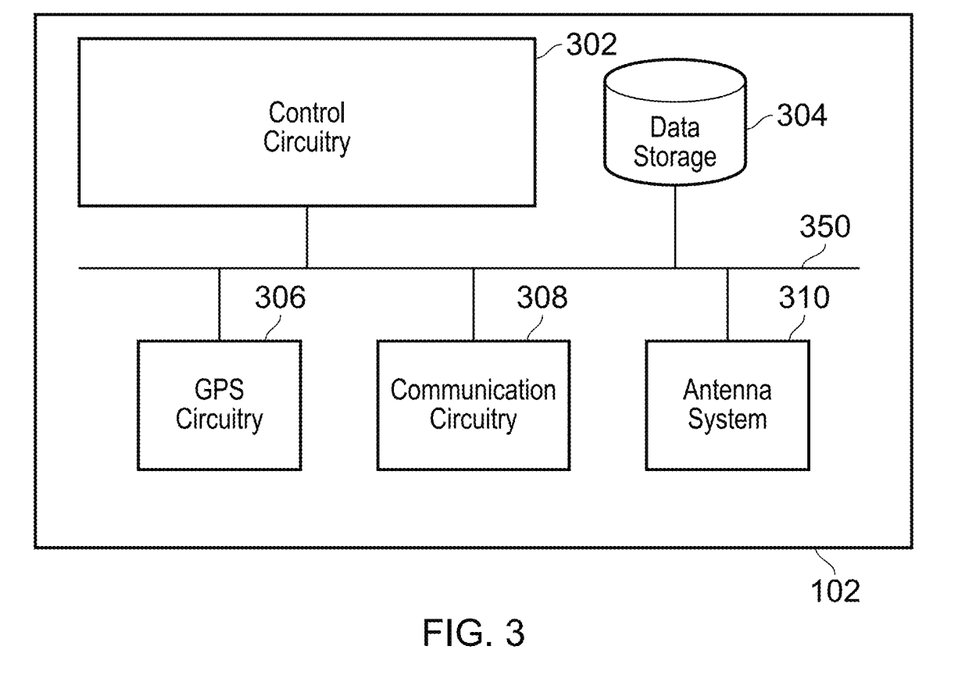
FIG. 3 schematically illustrates one example of an apparatus according to the present technique.

FIG. 3 schematically illustrates an example of the UER 102. As can be seen, the UER 102 comprises control circuitry 202 that is arranged to perform the selection operation described with reference to FIG. 2. The control circuitry 302 is coupled to GPS circuitry 306, communication circuitry 308 and an antenna system 310 via bus 350. The UER also comprises data storage 304 for storing data that may be used by the circuitry.

Figure 4A:
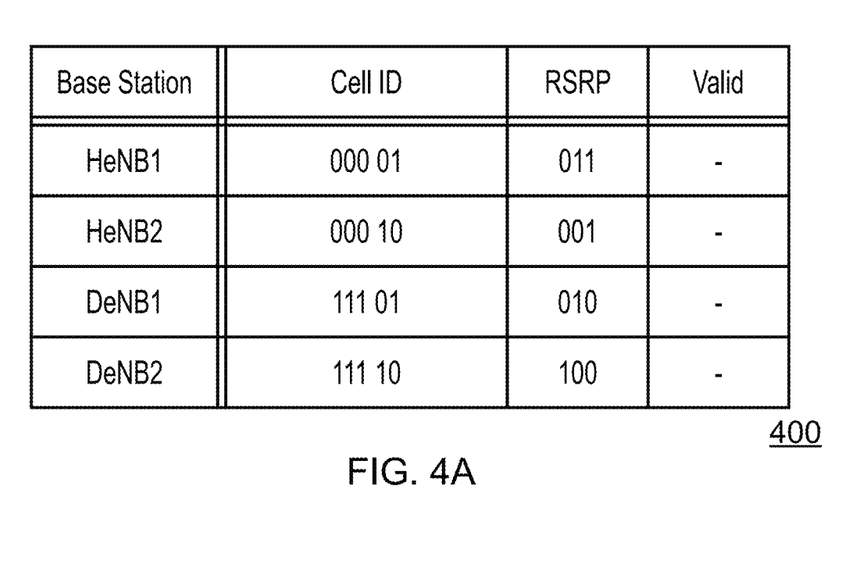
FIG. 4A shows one example of an ID list.

FIG. 4A shows an ID list 400 that may be obtained by the UER 102 during the initial scan. As can be seen, for each of the base stations 106, 108, the ID list comprises a 5-bit cell ID. The cell IDs of femto base stations HeNB1 and HeNB2 comprise leading zeros '000' in the three most significant bits of their cell ID. By contrast, the macro base stations DeNB1 and DeNB2 comprise leading ones '111' in the three most significant bits of their cell IDs. The ID list may optionally include further fields. For example, the ID list 400 of FIG. 4A also includes a Reference Signal Received Power (RSRP) field, which stores the result of a scan operation performed by the apparatus to determine the signal strength of each connection to the base stations. The ID list 400 also includes a valid bit, which can be used to indicate which of the base stations the UER is allowed to connect to. In this example, the valid bit has not yet been set.

Figure 4B:
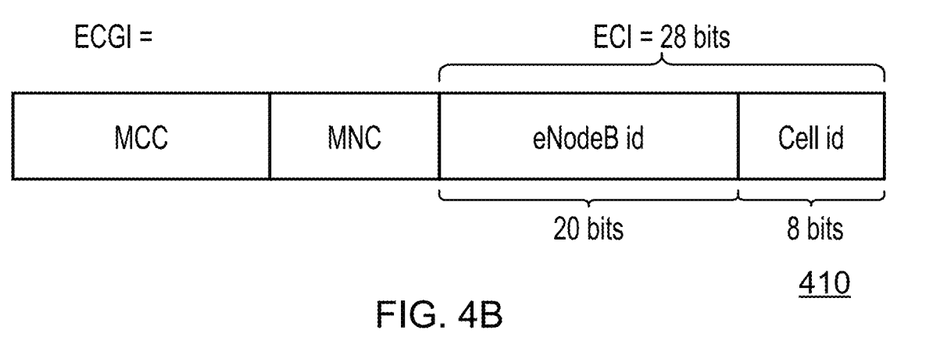
FIG. 4B shows one example of a Cell ID format.

FIG. 4B shows the E-UTRAN Cell Global Identifier (ECGI) data format, which is used to globally identify cells. The ECGI data format may be used as an alternative data format to populate the ID list in other examples of the present technique. As can be seen from FIG. 4B, the ECGI is made up from a Mobile Country Code (MCC), a Mobile Network Code (MNC), and an E-UTRAN Cell Identifier (ECI). The ECI is made up from a eNodeB identifier of 20 bits and a cell id of 8 bits.

Figure 4C:
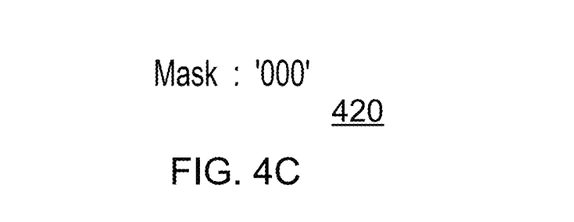
FIG. 4C shows one example of a mask that may be applied to the Cell IDs of an ID list.

FIG. 4C shows an example of a mask 420 that may applied to the cell IDs of the ID list 400. By applying the mask to the cell IDs, as will be shown with reference to FIG. 5, the apparatus 102 can determine which of the base stations stored in the ID lists are femto base stations and mark their valid bit as '0', indicating that these base stations are invalid, and should be avoided. Similarly, the remaining base stations that have not been masked may be marked as valid with a '1', and the apparatus 102 can subsequently select one of the valid base stations for connection to the network 100.

Figure 5:
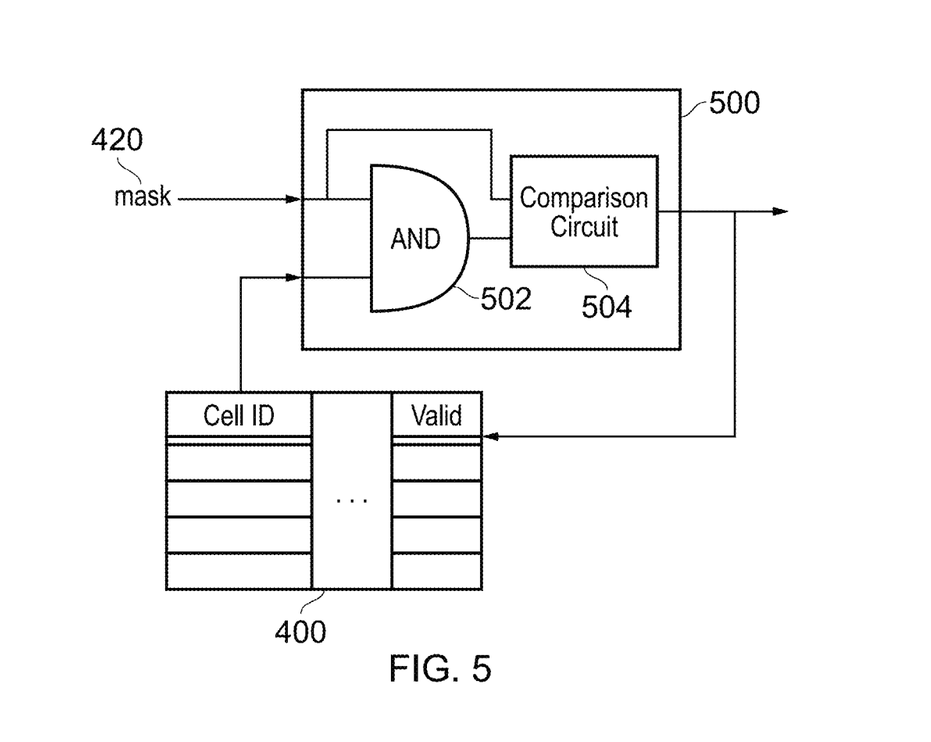
FIG. 5 schematically illustrates one example of masking circuitry to perform a masking operation according to the present technique.
Figure 6:
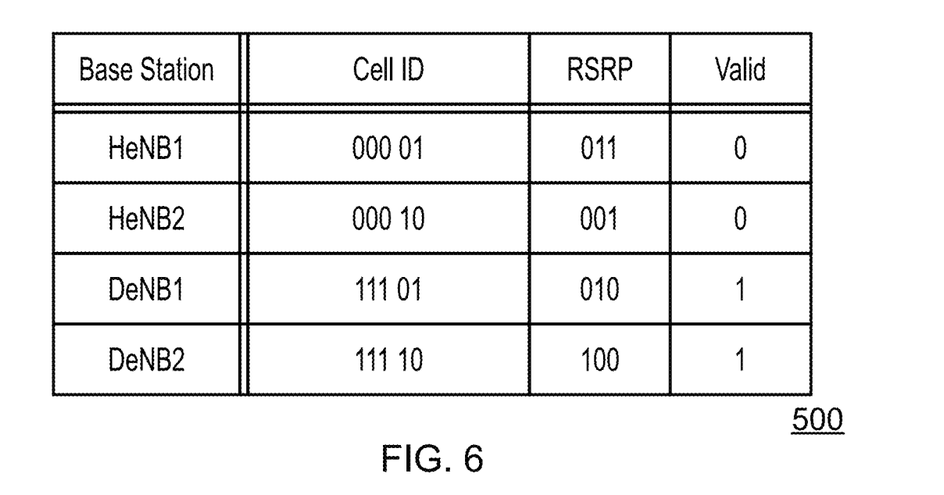
FIG. 6 shows one example of an updated ID list having the valid bits of each base station set based on a mask.

FIG. 5 illustrates one example of masking circuitry 500 according to the present technique. As can be seen, the masking circuitry 500 comprises an AND gate 502, which is arranged to perform a logical AND operation of the mask and the cell IDs of the ID list in order to perform a masking operation. The result of the AND operation is then passed to a comparison circuit 504, which will compare the three most significant bits of the result to the three most significant bits of the mask, and will set the corresponding valid bit accordingly.

For example, when applying the mask 420 to the cell ID of HeNB1, the logical operation of the AND gate can be expressed as: ('111 11' & '000 01')='000 01'. The comparison circuit 504 will then compare the three most significant bits of the result of the AND operation ('000') against the three most significant bits of the mask ('111') and determine that there is no match. As there is no match, the valid bit of HeNB1 is set as '0', indicating that the apparatus 102 is to avoid forming a connection with this base station. On the other hand, when the mask 420 is applied to the cell ID of DeNB2 for example, the logical operation of the AND gate is: ('111 11' & '111 10')='111 10'. When the comparison circuit 504 compares the three most significant bits of the AND operation ('111') against the three most significant bits of the mask ('111'), it will determine that there is a match, and therefore set the valid bit of DeNB2 to '1', indicating that this is a preferable candidate for the UER 102 to form a connection with.

Returning to FIG. 3, the apparatus 102 further comprises GPS circuitry 306, which may be used to determine a GPS location of the apparatus. The GPS location may be transmitted to the network management server 110 in addition to the ID list as shown in step 206 of FIG. 2 for example. On the basis of the GPS location of the apparatus 102, the network operator may also include GPS data indicating an alternative location to be returned to the apparatus 102 with the mask as shown in step 208.

Figure 7:
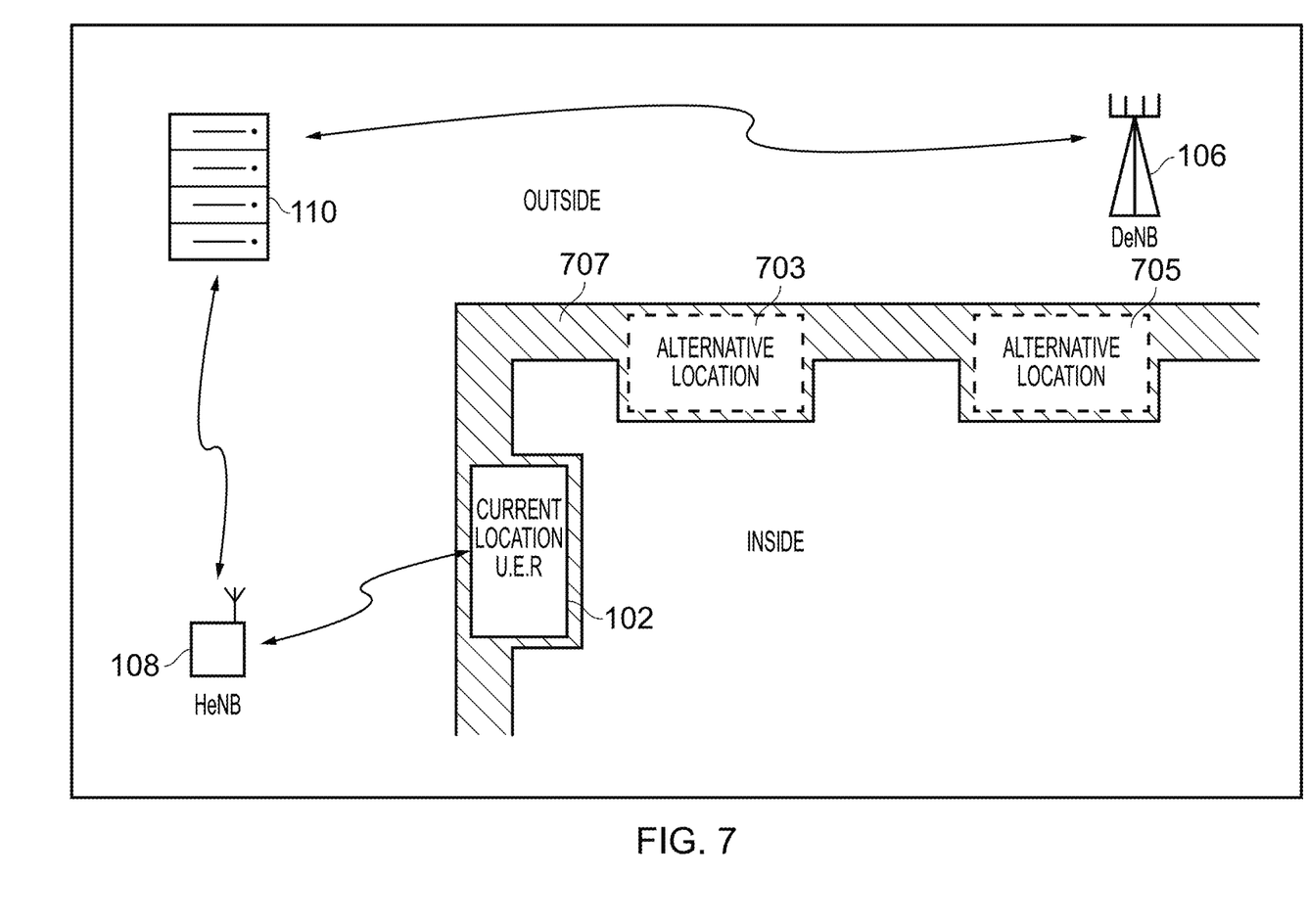
FIG. 7 illustrates another example of a network according to the present technique in which GPS data may be used to enhance network connectivity.

FIG. 7 illustrates one example where such a GPS fix may be useful in improving network connectivity. As shown in FIG. 7, the UER 102 is deployed at a current location at the periphery of a building 707. From the current location, the UER 102 is only able to form a connection with HeNB 108. In the manner described with reference to steps 202 and 204 of FIG. 2, the UER acquires the ID of HeNB and transmits this to the network management server 110. In this example, the UER also includes its current location in the form of GPS data in this transmission. Upon receipt of the GPS data, the network management server 110 is able to determine that the UER 102 can alternatively connect to a DeNB 106 if it were to be redeployed at an alternative location 703, 705. Therefore, when returning the mask, the network management server also returns GPS data, indicating an alternative location 703, 705 where the UER may be redeployed in order to make use of the more reliable, higher quality backhaul connection of the DeNB 106.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

The invention claimed is:

1. An apparatus configured to operate in a network, comprising:
   control circuitry configured to:
      obtain connection quality information comprising connection quality data indicative of a connection quality between said apparatus and each of a plurality of base stations in said network, each base station of said plurality of base stations having a backhaul connection between said base station and a device upstream of said base station, wherein said connection quality information comprises reference signal received power (RSRP) values; and
      perform a first selection operation to select a first base station, from said plurality of base stations, having a highest RSRP value as indicated by said connection quality data;
   connection circuitry configured to connect to said first base station; and
   communication circuitry configured to establish a connection to user equipment and to receive, from said first base station, characteristic data indicative of a characteristic of said backhaul connection of each of said plurality of base stations,
   wherein said characteristic of said backhaul connection is indicative of a quality of said backhaul connection between said base station and said device upstream of said base station,
   wherein said control circuitry is configured to perform a second selection operation to select a second base station from said plurality of base stations in dependence on said characteristic data,
   wherein said second base station and said first base station are different, and
   wherein said communication circuitry is further configured to connect said user equipment to said network via said second base station selected in dependence on said quality of said backhaul connection between said second base station and said device upstream of said second base station.

2. The apparatus according to claim 1, wherein in absence of said characteristic data, said connection circuitry is configured to maintain a connection with said first base station.

3. The apparatus according to claim 1, wherein said communication circuitry is configured to obtain identification values corresponding to each of said plurality of base stations, and to transmit a request for characteristic data, said request comprising said identification values.

4. The apparatus according to claim 1, wherein said characteristic data comprises a mask;
said communication circuitry is configured to obtain identification values corresponding to each of said plurality of base stations; and
said control circuitry is configured to apply said mask to said identification values to determine a set of base stations from said plurality of base stations.

5. The apparatus according to claim 4, wherein said control circuitry is configured to perform said second selection operation by selecting said second base station from said set of base stations.

6. The apparatus according to claim 4, wherein said control circuitry is configured to perform said second selection operation by selecting a base station other than said set of base stations as said second base station.

7. The apparatus according to claim 1, wherein said characteristic data identifies which of said plurality of base stations are macro base stations.

8. The apparatus according to claim 1, wherein said characteristic data identifies which of said plurality of base stations are femto base stations.

9. The apparatus according to claim 1, wherein said characteristic of said backhaul connection corresponds to any one or more of:
average uptime;
hop length;
bandwidth capacity; and
throughput capacity.

10. The apparatus according to claim 1, wherein said plurality of base stations are available base stations within range of said apparatus.

11. The apparatus according to claim 1 further comprising GPS circuitry configured to determine GPS position data of said apparatus, and said communication circuitry is configured to transmit a request for characteristic data comprising said GPS position data.

12. The apparatus according to claim 1, wherein said communication circuitry is configured to receive GPS position adjustment data indicating an alternative GPS position for said apparatus.

13. An apparatus configured to operate in a network, comprising:
means for performing a selection operation to:
obtain connection quality information comprising connection quality data indicative of a connection quality between said apparatus and each of a plurality of base stations in said network, each base station of said plurality of base stations having a backhaul connection between said base station and a device upstream of said base station, wherein said connection quality information comprises reference signal received power (RSRP) values; and
select a first base station, from said plurality of base stations, having a highest RSRP value as indicated by said connection quality data;
means for connecting to said first base station; and
means for establishing a connection to user equipment and for receiving, from said first base station, characteristic data indicative of a characteristic of said backhaul connection of each of said plurality of base stations,
wherein said characteristic of said backhaul connection is indicative of a quality of said backhaul connection between said base station and said device upstream of said base station,
wherein said means for performing said selection operation is configured to select a second base station from said plurality of base stations in dependence on said characteristic data,
wherein said second base station and said first base station are different, and
wherein said means for establishing said connection to said user equipment is further configured to connect said user equipment to said network via said second base station selected in dependence on said quality of said backhaul connection between said second base station and said device upstream of said second base station.

14. A method for an apparatus configured to operate in a network, said method comprising:
obtaining connection quality information comprising connection quality data indicative of a connection quality between said apparatus and each base station of a plurality of base stations, each base station of said plurality of base stations having a backhaul connection between said base station and a device upstream of said base station, wherein said connection quality information comprises reference signal received power (RSRP) values;
performing a first selection operation to select a first base station, from said plurality of base stations, having a highest RSRP value as indicated by said connection quality data;
receiving, from the first base station, characteristic data indicative of a characteristic of said backhaul connection of each of said plurality of base stations;
performing a second selection operation to select second base station from said plurality of base stations in dependence on said characteristic data, wherein said second base station and said first base station are different;
connecting to said second base station; and
establishing a connection to user equipment,
wherein said characteristic of said backhaul connection is indicative of a quality of said backhaul connection between said base station and said device upstream of said base station; and
wherein the method further comprises connecting said user equipment to said network via said second base station selected in dependence on said quality of said backhaul connection between said second base station and said device upstream of said second base station.

15. The apparatus of claim 1, wherein said communication circuitry is further configured to:
connect said user equipment to said device upstream via one of (i) said second base station selected in dependence on said quality of said backhaul connection between said second base station and said device upstream of said second base station and (ii) said first base station selected in dependence on said connection quality data indicative of said connection quality between said apparatus and each of said plurality of base stations.

* * * * *

UNITED STATES PATENT AND TRADEMARK OFFICE
CERTIFICATE OF CORRECTION

| | |
|---|---|
| PATENT NO. | : 11,102,785 B2 |
| APPLICATION NO. | : 15/782051 |
| DATED | : August 24, 2021 |
| INVENTOR(S) | : Kevin Andrew Terry et al. |

It is certified that error appears in the above-identified patent and that said Letters Patent is hereby corrected as shown below:

In the Claims

In Claim 14, at Column 10, Line 36 after the word "select", insert -- a --.

Signed and Sealed this
Tenth Day of May, 2022

Katherine Kelly Vidal
*Director of the United States Patent and Trademark Office*